May 23, 1950     L. T. SACHTLEBEN     2,508,892
OPTICAL OBJECTIVE SYSTEM FOR SOUND RECORDING
Filed Aug. 18, 1947     2 Sheets-Sheet 1
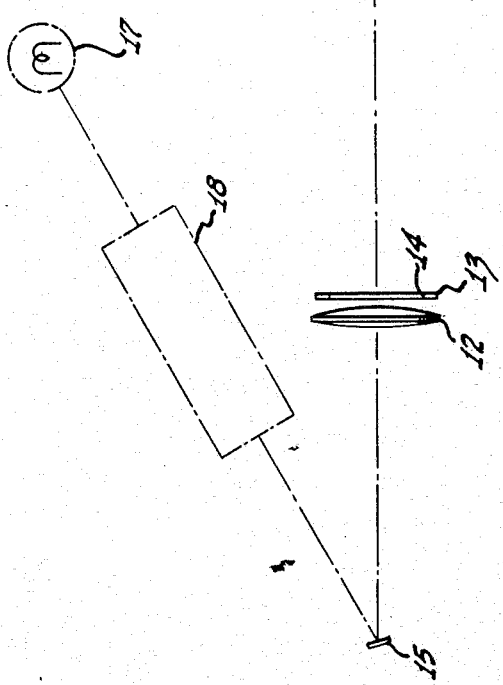
INVENTOR.
LAWRENCE T. SACHTLEBEN,
BY
ATTORNEY.

May 23, 1950     L. T. SACHTLEBEN     2,508,892
OPTICAL OBJECTIVE SYSTEM FOR SOUND RECORDING
Filed Aug. 18, 1947     2 Sheets-Sheet 2
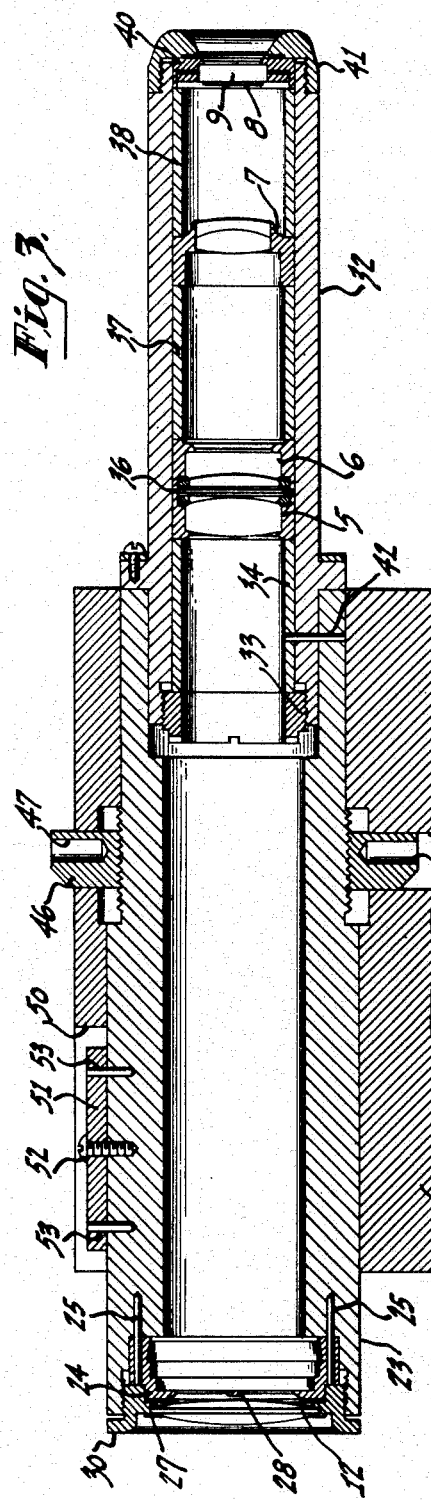
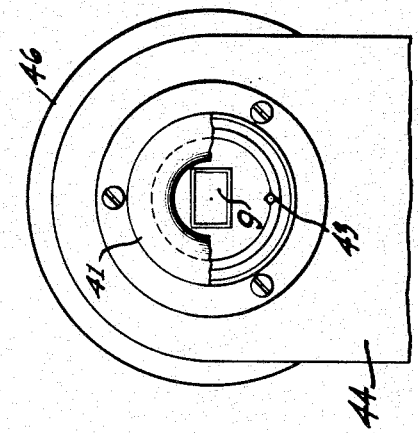
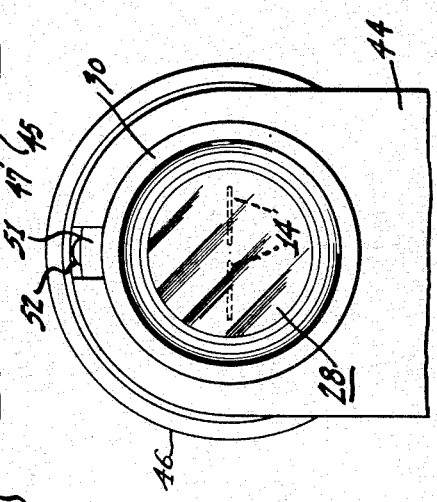
INVENTOR.
LAWRENCE T. SACHTLEBEN,
BY
ATTORNEY.

Patented May 23, 1950

2,508,892

UNITED STATES PATENT OFFICE 2,508,892

OPTICAL OBJECTIVE SYSTEM FOR SOUND RECORDING

Lawrence T. Sachtleben, Haddonfield, N. J., assignor to Radio Corporation of America, a corporation of Delaware Application August 18, 1947, Serial No. 769,239

20 Claims. (Cl. 88—57)

1

This invention relates to optical systems, and particularly to an improved objective lens for imaging a sound recording slit or aperture upon a film.

In the art of sound recording on photographic film, light is usually formed into a beam of predetermined shape which is vibrated across a narrow slit or light aperture in accordance with the variations in the signal being recorded. The light slit is imaged by a series of lenses onto the light sensitive emulsion of the film. Such objective optical systems have been in use for some time, usually projecting a slit of a certain size to a predetermined sound track area of a film having a width in the neighborhood of slightly less than 100 mils. The present invention is directed to an improved optical unit which images a slit of approximately the usual dimensions to a sound track area having a width in the neighborhood of slightly less than 200 mils. That is, the sound track is now being approximately doubled in width, and it is necessary that the same sharpness and definition of image upon the film be obtained. In the former type of objective systems, the slit was imaged upon the film by the use of a spherical lens of the type commonly known as a microscope objective. This objective usually consisted of two rather widely spaced achromatic doublets, and the magnification was the same in all meridians.

In the present invention, the lens nearer the film is replaced by a substantially equivalent cylindrical lens having an axis of curvature parallel to the slit and the imagery in a plane perpendicular to the slit is unchanged. Another cylindrical lens is then placed between the spherical lens and the slit and having such a focal length as to focus the length of the slit upon the film at an increased magnification. This lens has its power at right angles to the plane of power of the cylindrical lens near the film, and, by making it air-spaced, the curvature of its image may be controlled.

In addition to this general arrangement, the lenses of the system must be of excellent quality made from specified glasses with specified curvatures. The quality of the surfaces must be as nearly perfect as possible, and the lenses must be centered and edged within small tolerances.

The principal object of the invention, therefore, is to facilitate the projection of a sharp, well-defined image of a light aperture on a film.

Another object of the invention is to provide an improved optical system for imaging a light aperture.

2

A further object of the invention is to provide an improved objective lens for sound recording.

A still further object of the invention is to provide an improved anamorphosing objective lens for providing a predetermined sized image from a predetermined sized light aperture.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a top, schematic view of the optical system of the invention.

Fig. 2 is a side, schematic view of the optical system of Fig. 1.

Fig. 3 is a cross-sectional view of the mounting of the optical system of Figs. 1 and 2.

Fig. 4 is a left-hand end view of the lens mounting of Fig. 3, and

Fig. 5 is a right-hand end view of the lens holder of Fig. 3.

Referring now to the drawings, in which the same numerals identify like elements, the optical system of the invention is made up of five primary lenses such as a double convex cylindrical lens 5, a plano-concave cylindrical lens 6, a spherical cemented achromatic doublet 7, a double convex cylindrical lens 8, and a plano-concave cylindrical lens 9, lenses 8 and 9 being cemented into a cylindrical achromatic doublet. The usual condenser lens of a sound recording system is shown at 12 with a slit plate 13 having a slit 14 therein, and the mirror of a galvanometer 15. Shown in dotted lines are a light source 17 and a light beam shaping and projecting unit 18, these two units being any of those used in the standard type of sound recording system. The film upon which the image of the slit 14 is projected is shown at 20.

The operation of lenses 5–9, inclusive, is such that the lenses 5, 6, and 7 combine their refracting powers to image the ends of the slot 14 upon the film 20, while lenses 7, 8, and 9 combine their refracting powers to image the edges of the slit upon the film. The magnification of lenses 5, 6, and 7 is much greater than the magnification provided by lenses 7, 8, and 9, so that the ratio of length to width at the image is greater than the corresponding ratio at the slit, and this result is the primary purpose of the present optical unit. With this form of lens arrangement, it is possible to increase the length of the image as compared to that obtained with a wholly spherical system otherwise identical with lenses 7, 8, and 9 without lengthening the slit tself, and this is an important feature because the present system permits the large slit image to be formed from the usual size of recording slit, thus avoiding complicated and expensive design changes in this unit of a recording system. The present optical system also provides a constant light intensity throughout the image.

The spherical lens 7 has a focal length of approximately 1.040" with principal planes separated approximately .045". The tangential curvature due to this lens is approximately .003" at an image point in the film plane about .10" from the axis of the lens, and the sagittal image curvature is negligible for an image of this extent. Since this magnitude of tangential curvature is excessive, it is corrected by air spacing the cylindrical lenses 5 and 6. Also, the difficulty of manufacture is minimized by keeping one surface of lens 6 plane. The lenses 5 and 6 are chromatically corrected for the dominant spectrum line of 4047 Angstroms and corrected for coma and spherical aberrations within the Rayleigh quarter wave length limit.

The distance between the outer surfaces of the lenses 5 and 6 is .372", while the space between their adjacent surfaces is .096". The image flattening effect of lenses 5 and 6 is dependent not only upon their dimensions, indexes, dispersions, and spacings, but also upon the stop or diaphragm position which is the image of the galvanometer mirror by condenser lens 12, whose marginal zone images the mirror at a point 1.583" to the right of the anterior vertex of lens 5. The slit to be imaged is .5412" by .0018", the slit being 3.419" from the front surface of lens 5. The mirror is 2.6305" from the slit.

The image surface curvature to be corrected is concave toward the light source by .003" at the field margin. Furthermore, lenses 5 and 6 with a stop position as defined produce a real image of the slit ends at a magnification of about 5.719 times having a curvature convex toward the light source by .911". This image constitutes a virtual object for lens 7 which magnifies it 1/17.597 times to the final image in the film plane. The curvature is at the same time magnified $(1/17.597)^2$ times, where it becomes .00294" convex toward the light source and cancels the substantially equal concave curvature contributed by lens 7 itself. In the quadrate plane, illustrated in Fig. 2, lenses 7, 8, and 9 cooperate to image the slit edges upon the film plane at a magnification of 1/7.5 times. The size of the image is "therefore" .176" in length and .00025" in width.

The lens 5 is of dense barium crown glass having an $N_d$ value of 1.61088 and a "V" value of 57.2. Its anterior surface radius of curvature is 1.261", and its posterior surface radius of curvature is 2.100". Lens 6 is of extra dense flint glass with $N_d$ equal to 1.64900 and "V" equal to 33.8. Its negative surface has a radius of curvature of 1.418". For the cemented cylindrical achromatic doublet, lens 8 is of borosilicate crown glass with an $N_d$ of 1.51700 and a "V" of 64.5, its anterior surface radius of curvature being .251", and its posterior surface radius of curvature being .330". Lens 9 is of dense flint glass with an $N_d$ of 1.61700 and a "V" of 36.6, its negative surface radius of curvature being .330". The surfaces of all lenses are coated with magnesium fluoride.

To explain further the exact arrangement of lenses 5–9, inclusive, the distance between the plane surface of lens 6 and the anterior surface of lens 7 is .878", and from this anterior surface to the posterior surface of lens 9, the distance is .841" which is .247" from the film. As mentioned above, the proper or zero azimuth for cylindrical lenses 5 and 6 includes the long dimension of slit 14, while the proper azimuth for cylindrical lenses 8 and 9 includes the narrow dimension of the slit. Incorrect or finite azimuth of either lens 5 or 6, or 8 and 9 will diminish its power in the plane of the proper azimuth, and, also, the lens will begin to exhibit power at 90 degrees to its proper azimuth and will have intermediate effects in intermediate planes. Thus, if any of the lenses are out of proper azimuth, it is seen that the power of the system in all planes, including the axis of the system, is disturbed, and, if more than one lens is out of proper azimuth, the disturbances are compounded. In addition to focal disturbances resulting from azimuth errors, effects appearing as a rotation of the image may also be introduced and compounded if the lenses are not properly adjusted in all directions. Thus, a special form of mounting for the lenses is shown at Figs. 3, 4, and 5, which will now be described.

A main cylindrical barrel 23 has at one end thereof a cell 24 held in rotational position by pins 25 and mounting the slit plate 27 having a septum 28 for dividing the slit into the two equal portions. The condenser lens 12 is mounted in a holder 30 threadedly mounted in the end of barrel 23 and which holds the cell 24 in position. At the other end of the barrel 23 is a smaller cylindrical barrel 32 in which the lenses 5–9, inclusive, are mounted, as disclosed and claimed in my U. S. Patent No. 2,258,223 of October 7, 1941.

The final assembly includes a hollow cap 33, which is threaded into the end of barrel 32. The next element is a spacer 34 inserted within the barrel 32, and the lens 5 positioned against the spacer 34. The surface of the lens 5 toward the mirror 15 has a free aperture of .400", while the other surface of this lens has a free aperture of .380". By spacers 36, the lens 6 is positioned from the lens 5 by a distance of .096" as mentioned above, the negative curvature of the lens 6 having a free aperture of .348", while the plane surface of this lens has a free aperture of .336". A spacer 37 is then used to position the spherical lens 7 from the lens 6, this lens being the longer focal length doublet from a Bausch and Lomb No. 5507 white light objective. A third spacer 38 spaces the cylindrical lenses 8 and 9 mounted in a cell 40, all of the units being held in longitudinal or axial position by a screw cap 41. The free apertures of the surfaces of lenses 8 and 9 are .150" in their plane of maximum power and .250" in the quadrate plane. Lenses 5 and 6 have free apertures of .168" in the plane including the narrowest dimension of the slit.

As described in my above-mentioned patent, the lenses 5–9, inclusive, are arranged in a fixture on an optical bench, and a V groove is cut along all the elements so that a rod 43 may be inserted in this groove and a groove provided in the barrel 32 to maintain the lenses in their proper orientation. The barrel 32 is then inserted in the barrel 23 and properly rotated and axially positioned with respect to the slit 14 and condenser 12 and then pinned by a pin 42.

The barrel 23 is now mounted in a bracket 44, the bracket having an annular recess 45 in which is positioned a knurled ring 46 threaded to the barrel 23. Holes 47 are provided in the ring 46 for the use of a wrench. This arrangement permits axial positioning of the entire unit with respect to the film. To maintain the proper orientation of the entire objective assembly, a groove 50 in the bracket 44 has positioned therein a block 51 which is attached to the barrel 23 by both a screw 52 and pins 53. Thus, during axial adjustment of the unit by ring 46, proper orientation of the elements is maintained.

I claim:

1. An optical assembly comprising a main barrel having a condenser lens and slit plate mounted in one end thereof, a second barrel mounted in the other end of said main barrel, said second barrel having a series arrangement of a pair of air-spaced cylindrical lenses, a spherical lens and a second pair of cemented cylindrical lenses, individual mountings for each of said lenses, each of said mountings having a groove cut on the outer circumference thereof and a groove in the inner surface of said second barrel opposite said mounting grooves, means insertable in said grooves for holding said mountings in a predetermined orientation, and a mounting bracket for axially adjusting said assembly while maintaining orientation of said lenses and slit plate.

2. An optical assembly in accordance with claim 1, in which said grooves provided in the mountings for said pairs of lenses and said spherical lens and in the inner wall of said second barrel are V-shaped, and said means is a rod positioned in said groove to maintain the orientation of said lenses.

3. An objective optical unit comprising five lenses in series, the first of said lenses being a double convex cylindrical lens, the second lens being a plano concave cylindrical lens, the third lens being a double convex spherical lens, the fourth lens being a double convex cylindrical lens, and the fifth lens being a plano concave cylindrical lens, the axis of orientation of said fourth and fifth lenses being 90 degrees to the axis of orientation of said first and second lenses, the combination of said first and second lenses and the combination of said fourth and fifth lenses having their maximum powers in the same meridian and combining to have a resultant positive power in their common meridian of maximum power and no resultant power in a quadrate meridian.

4. An objective optical unit in accordance with claim 3, in which said first and second lenses are air-spaced and said fourth and fifth lenses are cemented together, said first, second, and third lenses combining to produce a magnification different from the magnification produced by said third, fourth, and fifth lenses.

5. An objective optical unit in accordance with claim 4, in which said first lens is of dense barium crown having an $N_d$ value of 1.61088 and a "V" value of 57.2, and said second lens is of extra dense flint having an $N_d$ value of 1.64900 and a "V" value of 33.8.

6. An objective optical unit in accordance with claim 5, in which said fourth lens is of borosilicate crown having an $N_d$ value of 1.51700 and a "V" value of 64.5, and said fifth lens is of dense flint with an $N_d$ value of 1.61700 and a "V" value of 36.6.

7. An objective optical unit in accordance with claim 6, in which the anterior surface radius of curvature of said first lens is 1.261", and the posterior surface radius of curvature is 2.100", and the negative surface radius of curvature is 1.418".

8. An objective optical unit in accordance with claim 7, in which the anterior surface radius of curvature of said fourth lens is .251", and the posterior surface radius of curvature of said lens and the negative surface radius of curvature of said fifth lens is .330".

9. An objective lens system comprising a positive spherical lens situated between two cylindrical lens combinations, each having positive power, the distance from the positive spherical lens to the cylindrical combination of longer focal length being less than 125% of the focal length of the spherical lens, and greater than 75% of the same focal length, and the distance between the positive spherical lens and the cylindrical combination of shorter focal length being less than 75% of the focal length of the spherical lens and greater than 50% of the same focal length.

10. An objective lens system in accordance with claim 9, in which the two cylindrical lens combinations have their planes of maximum power in quadrate meridians.

11. An objective lens system in accordance with claim 9, in which the magnification for homocentric imagery is less than twenty times and greater than two times in the meridian of maximum power for the cylindrical combination of shorter focal length, and is less than ten times and greater than one-half times in the plane of maximum power for the cylindrical combination of longer focal length, when the object point lies closer to the cylindrical combination of shorter focal length than 50% of the focal length of the spherical lens.

12. An objective lens system in accordance with claim 9, in which the focal length of the cylindrical lens combination of longer focal length is less than 350% of the focal length of the spherical lens, and greater than 200% of the focal length of the spherical lens, and the focal length of the cylindrical lens combination of shorter focal length is less than 100% of the focal length of the spherical lens, and greater than 20% of the focal length of the spherical lens.

13. An objective lens system in accordance with claim 9, in which the cylindrical lens combination of longer focal length comprises an air-spaced pair of positive and negative cylindrical lenses having coincident meridians of maximum power and is designed to substantially flatten the tangential image surface for the combination of itself and the spherical lens.

14. In an optical system, the combination of a condenser lens adjacent an object, and an objective lens system, comprising a positive spherical lens situated between two cylindrical lens combinations, each having positive power, the distance from the positive spherical lens to the cylindrical combination of longer focal length being less than 125% of the focal length of the spherical lens, and greater than 75% of the same focal length, and the distance between the positive spherical lens and the cylindrical combination of shorter focal length being less than 75% of the focal length of the spherical lens and greater than 50% of the same focal length, said objective system being in such cooperative relationship with said condenser that light from the object forms an image of the source at a distance beyond the first refracting surface of said objective lens combination which is not less than 100% of the focal length of the positive spherical lens of said combination and not more than 200% of the same focal length.

15. An optical system in accordance with claim 14, in which the air-spaced cylindrical lens combination comprises a positive cylindrical lens of crown glass having a refractive index of substantially $N_D=1.61088$ and a "V" value of 57.2 and a negative cylindrical lens of flint glass having a refractive index of substantially $N_D=1.64900$ and a "V" value of 33.8, the center thickness of the crown lens being substantially 0.163" and of the flint lens substantially 0.113", while the air-space between them exceeds 3% of the focal length of the spherical lens, but is less than 15% of the same focal length.

16. An optical system in accordance with claim 14, in which the algebraic difference of the surface curvatures of the negative lens of the air-spaced cylindrical lens combination numerically exceeds one-fourteenth of the focal length of the spherical lens, but does not exceed one and one-half times the focal length of said spherical lens, and the algebraic difference of the surface curvatures of the positive lens of said air-spaced combination numerically exceeds one-sixth of the focal length of said spherical lens, but does not exceed three times the focal length of said spherical lens.

17. An optional system in accordance with claim 14, in which the ratio of the algebraic difference of the surface curvatures of the flint lens to the algebraic difference of the surface curvatures of the crown lens numerically exceeds 25% of the ratio of the focal length of the spherical lens to the distance between the spherical lens and the air-spaced cylindrical lens combination, but does not exceed twice said ratio.

18. An optical system in accordance with claim 14, in which the axial thickness of the crown lens of said air-spaced cylindrical lens combination is in excess of 5% of the focal length of the spherical lens, but is less than 50% of the thickness of said spherical lens, and the axial thickness of the flint lens of the same combination is in excess of 3% of the focal length of the spherical lens, but is less than 35% of the focal length of said spherical lens.

19. An optical system in accordance with claim 14, in which the focal length of the crown lens of the cylindrical lens combination of longer focal length is less than 150% and greater than 100% of the focal length of said spherical lens, and the focal length of the flint lens of said combination is less than 250% and greater than 150% of the focal length of said spherical lens.

20. An optical system in accordance with claim 14, in which the ratio of the axial thickness of said crown lens to the focal length of the combination of said crown and flint lenses is in excess of 0.02, but does not exceed 0.15, and the ratio of the axial air space between said crown and flint lenses to the focal length of the combination is in excess of 0.01, but does not exceed 0.10.

LAWRENCE T. SACHTLEBEN.

REFERENCES CITED

The following references are of record in the file of this patent:

UNITED STATES PATENTS

| Number | Name | Date |
|---|---|---|
| 1,821,623 | Emmerich | Sept. 1, 1931 |
| 1,938,808 | Ceccarini | Dec. 12, 1933 |
| 2,005,068 | Batsel | June 18, 1935 |
| 2,017,634 | Newcomer | Oct. 15, 1935 |
| 2,036,622 | Emmerich | Apr. 7, 1936 |
| 2,121,568 | Newcomer | June 21, 1938 |
| 2,164,747 | Landis | July 4, 1939 |
| 2,258,223 | Sachtleben | Oct. 7, 1941 |

FOREIGN PATENTS

| Number | Country | Date |
|---|---|---|
| 8,512 | Great Britain | of 1898 |